(12) United States Patent
Worrell et al.

(10) Patent No.: US 8,047,097 B2
(45) Date of Patent: Nov. 1, 2011

(54) STEERING WHEEL AND METHOD OF MAKING

(75) Inventors: Barry C. Worrell, Centerville, OH (US); James J. Simpson, Fairbor, OH (US); Philip W. Hopf, Dayton, OH (US); Frank G. Meyer, Livonia, MI (US)

(73) Assignee: Autoliv Development AB, Vargarda (SE)

( * ) Notice: Subject to any disclaimer, the term of this patent is extended or adjusted under 35 U.S.C. 154(b) by 1156 days.

(21) Appl. No.: 11/772,232

(22) Filed: Jul. 1, 2007

(65) Prior Publication Data

US 2009/0000420 A1    Jan. 1, 2009

(51) Int. Cl.
*G05G 1/10* (2006.01)
*B62D 1/04* (2006.01)
*B62D 1/06* (2006.01)
*B32B 27/00* (2006.01)
*B32B 37/24* (2006.01)

(52) U.S. Cl. ........... 74/552; 74/558; 156/73.1; 156/242; 428/90

(58) Field of Classification Search ............ 74/552, 74/558, 484 R; 428/90; 156/73.1, 242
See application file for complete search history.

(56) References Cited

U.S. PATENT DOCUMENTS

| 2,892,359 | A  | *  | 6/1959  | Overman ............... 74/484 R |
| 4,456,443 | A  |    | 6/1984  | Rabotski |
| 6,418,814 | B1 | *  | 7/2002  | Emeneth et al. .......... 74/552 |
| 6,637,289 | B2 | *  | 10/2003 | Kreuzer et al. ........... 74/552 |
| 6,668,683 | B2 | *  | 12/2003 | Fleckenstein ............ 74/552 |
| 6,918,317 | B2 | *  | 7/2005  | Lee ........................... 74/558 |
| 6,928,898 | B2 | *  | 8/2005  | Albayrak et al. ......... 74/552 |
| 7,685,905 | B2 | *  | 3/2010  | Miltenberger et al. .... 74/552 |
| 2001/0054327 | A1 | * | 12/2001 | Ishii et al. ................. 74/552 |
| 2003/0037633 | A1 | * | 2/2003  | Grilli et al. ............... 74/552 |
| 2006/0257617 | A1 | * | 11/2006 | Worrell et al. ............ 428/90 |
| 2010/0251849 | A1 | * | 10/2010 | Kurata et al. ............. 74/552 |
| 2011/0100155 | A1 | * | 5/2011  | Jenny et al. .............. 74/552 |

* cited by examiner

*Primary Examiner* — Vinh T. Luong
(74) *Attorney, Agent, or Firm* — Harness, Dickey & Pierce, P.L.C.

(57) ABSTRACT

A steering wheel assembly, comprising: an insert comprising an armature, a rim portion and at least one spoke connecting the armature to the rim portion; a rim assembly comprising a first rim portion and a second rim portion, the first rim portion and the second rim portion each being configured to be disposed around a periphery of the rim portion of the insert and the first rim portion and the second rim portion are configured to be secured to each other about the rim portion of the insert, the first rim portion and the second rim portion each being separately formed from a polymeric material prior to the securement of the rim assembly to the rim portion of the insert; and a decorative cover disposed about an exterior surface of the rim assembly.

15 Claims, 5 Drawing Sheets

STEERING WHEEL AND METHOD OF MAKING

BACKGROUND

Exemplary embodiments of the present invention relate to vehicle steering wheels, and more particularly, to methods of manufacturing steering wheels as well as steering wheels formed using the methods of manufacturing.

A steering wheel is an integral component of most vehicles, including all mass-production vehicles. The steering wheel allows an operator to translate desired movement to a steering system of the vehicle.

A steering wheel assembly typically comprises a metal insert having a rim portion, a hub portion or armature, and one or more spokes securing the rim to the hub. In addition, steering wheels can comprise an outer decorative covering layer and, in some instances, a foam layer disposed therebetween. The outer decorative covering layer is often included with the steering wheel to enhance the grip or comfort of the wheel, or simply as decoration. Today, the covering material applied to the steering wheel insert is molded directly onto the steering wheel insert and is either urethane foam, urethane foam covered with leather, injection molded plastic or injection molded plastic covered with leather.

The assembly of such a steering wheel can be labor intensive due to the complex three-dimensional shapes of modern steering wheels. Steering wheels are typically produced by first by manufacturing a die cast metal frame or insert structure comprising a rim that is integral with a hub and one or more spokes, then placing the die cast structure in a mold and molding the layer of covering material around it. The layer of molding material is typically comprised of urethane foam or injection molded plastic, and the molding operation can require as many as three minutes or more per steering wheel as well as using an expensive urethane mold.

Thereafter, an outer steering wheel cover or wrap, such as one made of leather or wood, can be placed on the steering wheel. Alternatively, the molding material can comprise the outer covering layer of the steering wheel. If the outer steering wheel wrap is leather, a leather pattern is hand sewn onto the rim and spokes of the steering wheel. This is achieved by placing a precut pattern onto the rim and hand sewing it onto the rim of the steering wheel. The sewing, however, can create protruding seams that leads to imperfections in the outer surface of the steering wheel.

Accordingly, it is desirable to provide a cost-efficient method of manufacturing a steering wheel having a uniform exterior surface and to provide a steering wheel manufactured using this method.

SUMMARY

In accordance with an exemplary embodiment a steering wheel assembly is provided. The steering wheel assembly comprising: an insert comprising an armature, a rim portion and at least one spoke connecting the armature to the rim portion; a rim assembly comprising a first rim portion and a second rim portion, the first rim portion and the second rim portion each being configured to be disposed around a periphery of the rim portion of the insert and the first rim portion and the second rim portion are configured to be secured to each other about the rim portion of the insert, the first rim portion and the second rim portion each being separately formed from a polymeric material prior to the securement of the rim assembly to the rim portion of the insert; and a decorative cover disposed about an exterior surface of the rim assembly.

In another exemplary embodiment, a method of manufacturing a steering wheel assembly is provided the method comprising: forming separate portions of a rim assembly via a molding process, the rim assembly having at least a first rim portion and a second rim portion, the first rim portion and the second rim portion each having a channel; securing the first rim portion and the second rim portion to each other and around a portion of a rim of a steering wheel insert, the rim being received within a cavity defined by the channel of the first rim portion and the channel of the second rim portion; and wrapping a decorative cover around an exterior surface of the first rim portion and the second rim portion, the decorative cover having an outer show surface.

The above-described and other features and advantages of the present invention will be appreciated and understood by those skilled in the art from the following detailed description, drawings, and appended claims.

DETAILED DESCRIPTION

Figure 1:
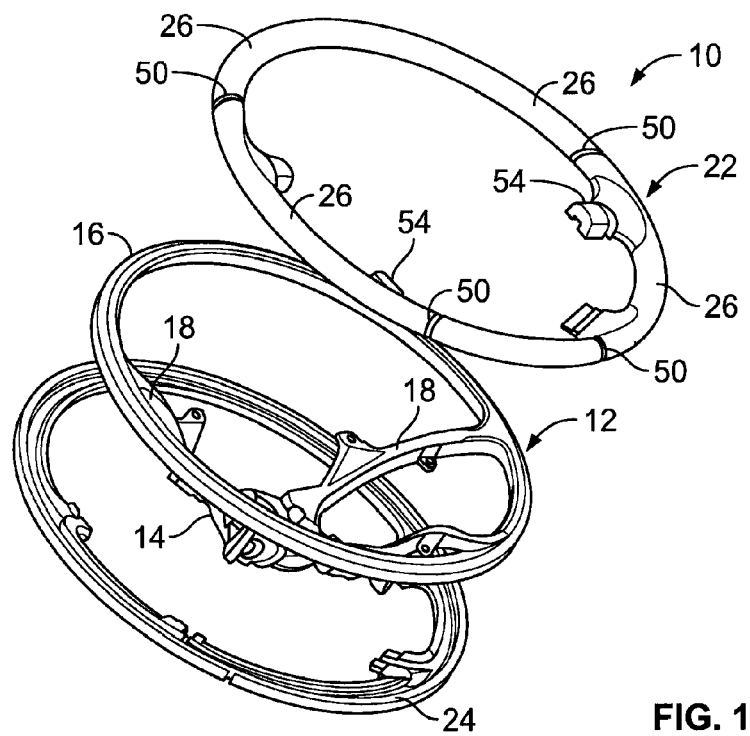
FIGS. 1 and 2 are perspective views of a steering wheel assembly manufactured in accordance with an exemplary embodiment of the present invention.
Figure 2:
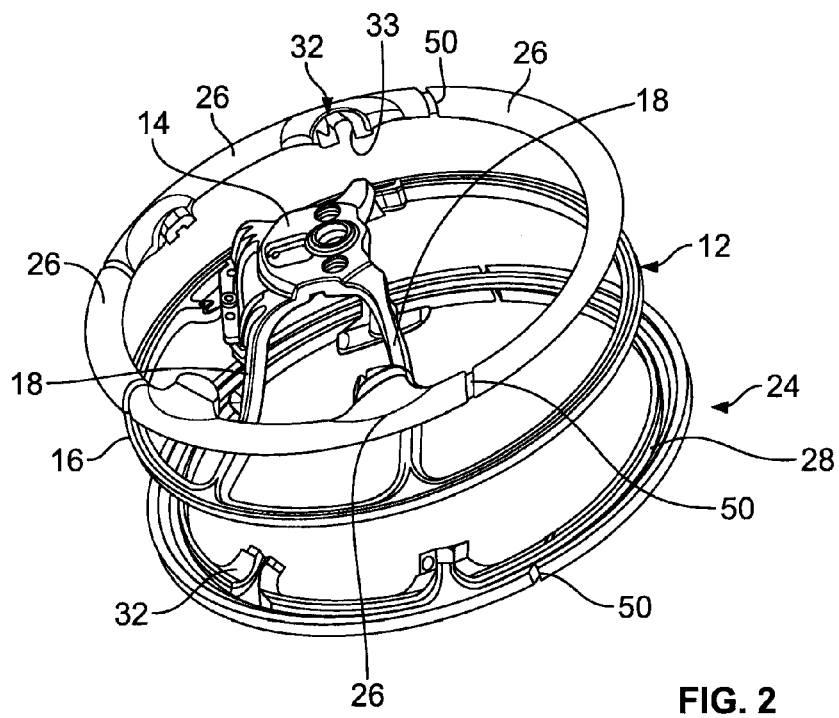

In accordance with exemplary embodiments of the present invention, a method of manufacturing a steering wheel using a rim assembly comprising a subassembly and a steering wheel assembled from this subassembly is disclosed herein. In accordance with an exemplary embodiment of the present invention, rather than being molded about the steering wheel insert, a molded layer of covering material is formed or prefabricated separately from the insert. This separately molded or prefabricated layer of covering material is formed into a rim assembly comprising at least two components that are secured about the insert to provide a surface that is wrapped with a decorative covering layer (e.g., leather or other materials).

In one exemplary embodiment of the present invention, the separate parts of the rim assembly comprises a plurality of arcuate members which when assembled form a ring, rim or circular member that corresponds to the rim of the steering wheel insert. In this embodiment, the arcuate members are nested in the tool used to form the parts so as to maximize the usable space of the tooling surfaces, which in the past would not have been possible if the parts were molded to have a closed circular ring with a diameter corresponding to the rim of the steering wheel insert. In other words, a plurality of arcuate shaped members are capable of being nested more efficiently on the tool as opposed to a plurality of rings or circles each having the same diameter. Of course, exemplary embodiments of the present invention are also directed to circular members also formed in the tools, wherein one of the members is an upper or first rim portion and the second rim portion is a lower rim portion. Alternatively and in the cases of a plurality of arcuate members the plurality of arcuate members are configured to separately form the upper or first rim portion and the second or lower rim portion.

Regardless of the embodiment contemplated, the use of prefabricated or separately formed rim assembly components allows the steering wheel insert, the rim assembly and the decorative outer steering wheel cover or wrap, to be manufactured as separate components at separate locations and shipped separately.

Thus, the separate assembly of exemplary embodiments of the present invention can allow for improved packaging efficiencies and lower associated shipping costs. Moreover, the separate subassembly allows for an easier substitution of materials and embodiments used for the steering wheel insert, the rim assembly and the decorative outer layer. For example, a common exemplary embodiment of a steering wheel insert can be manufactured and stocked in both die cast magnesium and aluminum variations, while embodiments of the molded components of the rim assembly corresponding to the common steering wheel insert component could be stocked in polyurethane, resins, foams, expandable foams, expandable foam plastic materials such as polystyrene, polypropylene, polyethylene and inter-polymers and injection molded plastic variations. Moreover, the separate assembly permits a number of molded embodiments or assemblies corresponding to a common steering wheel insert component or a family of inserts to be manufactured in a variety of designs, shapes, operator grip diameters (e.g., varying diameters of the rim assembly surrounding the rim portion of the insert thus providing numerous options), and operator grip features as well as methods and materials for forming the separate assemblies.

Referring now to FIG. 1, an exploded view of an exemplary embodiment of a steering wheel assembly 10 constructed in accordance with an exemplary embodiment of the present invention is illustrated. When assembled into a steering wheel, steering wheel assembly 10 is operably connected to a steering mechanism (not shown). In an exemplary embodiment, steering wheel assembly 10 includes an integral and one-piece frame portion or insert 12 that defines the general shape and configuration of the steering wheel. Exemplary embodiments of insert 12 can be made from a metal material such as magnesium, aluminum, or steel, or combinations thereof, and can be formed from a casting process. Insert 12 comprises an inner hub or armature 14, an outer rim 16 circumscribing the hub or armature, and a plurality of spokes 18, which interconnect the hub with the outer rim. In an alternative exemplary embodiment, the outer rim may comprise at least a pair of rim segments that only partially provide a portion of the rim of the steering wheel. Although four spoke portions are shown in the exemplary embodiment of FIG. 1, it should be understood that one or several spoke portions may be provided in accordance with alternative exemplary embodiments of the present invention.

In accordance with an exemplary embodiment of the present invention, steering wheel subassembly 10 also includes a prefabricated or preformed molded rim assembly 20 that is configured to enclose the rim of insert 12 and provide a layer around the rim of the insert. Rim assembly 20 is configured to be disposed about and around the diameter of outer rim 16 and over a portion of spokes 18. In accordance with an exemplary embodiment of the present invention rim assembly 20 comprises at least two sections: an upper or first half section 22 and a lower or second half section 24 each of which are configured to mate with each other and surround the rim portion of the insert. With particular reference to this embodiment upper section 22 is intended to refer to the portion of the rim assembly that has an exterior surface that faces toward the vehicle operator and lower section 24 is intended to refer to the portion of the rim assembly that has an exterior surface that faces away from the vehicle operator. In other words, the majority of the exterior surface of the upper section 22 faces toward the vehicle operator and the majority of the exterior surface of the lower section 24 faces away from the vehicle operator. Thus, a first rim portion 22 and a second rim portion 24 are provided to create rim assembly 20 when assembled together.

In accordance with one non-limiting alternative exemplary embodiment of the present invention each section or rim portion (22, 24) will comprise a plurality of segmented arcuate portions 26 that each correspond to a segment rim portion configured to be positioned over a portion of the diameter of outer rim 16. As will be described herein, the arcuate portions will have varying lengths and when assembled define the first and second half sections of the rim assembly. In accordance with an exemplary embodiment of the present invention the arcuate portions each define a portion of either the first half section 22 or the second half section 24 of the rim assembly 20. Thus, when assembled together as in FIG. 1, each plurality of segmented arcuate portions will comprise the corresponding half section of the molded layer or section of the rim assembly.

In accordance with an alternative exemplary embodiment of the present invention, the segmented arcuate portions 26 are configured to be disposed over only a portion of the rim of the insert. In this embodiment, other portions of the rim are raised to be flush with an exterior surface of the arcuate portions. In other words, the rim insert has pockets configured to receive the arcuate portions.

Figure 7:
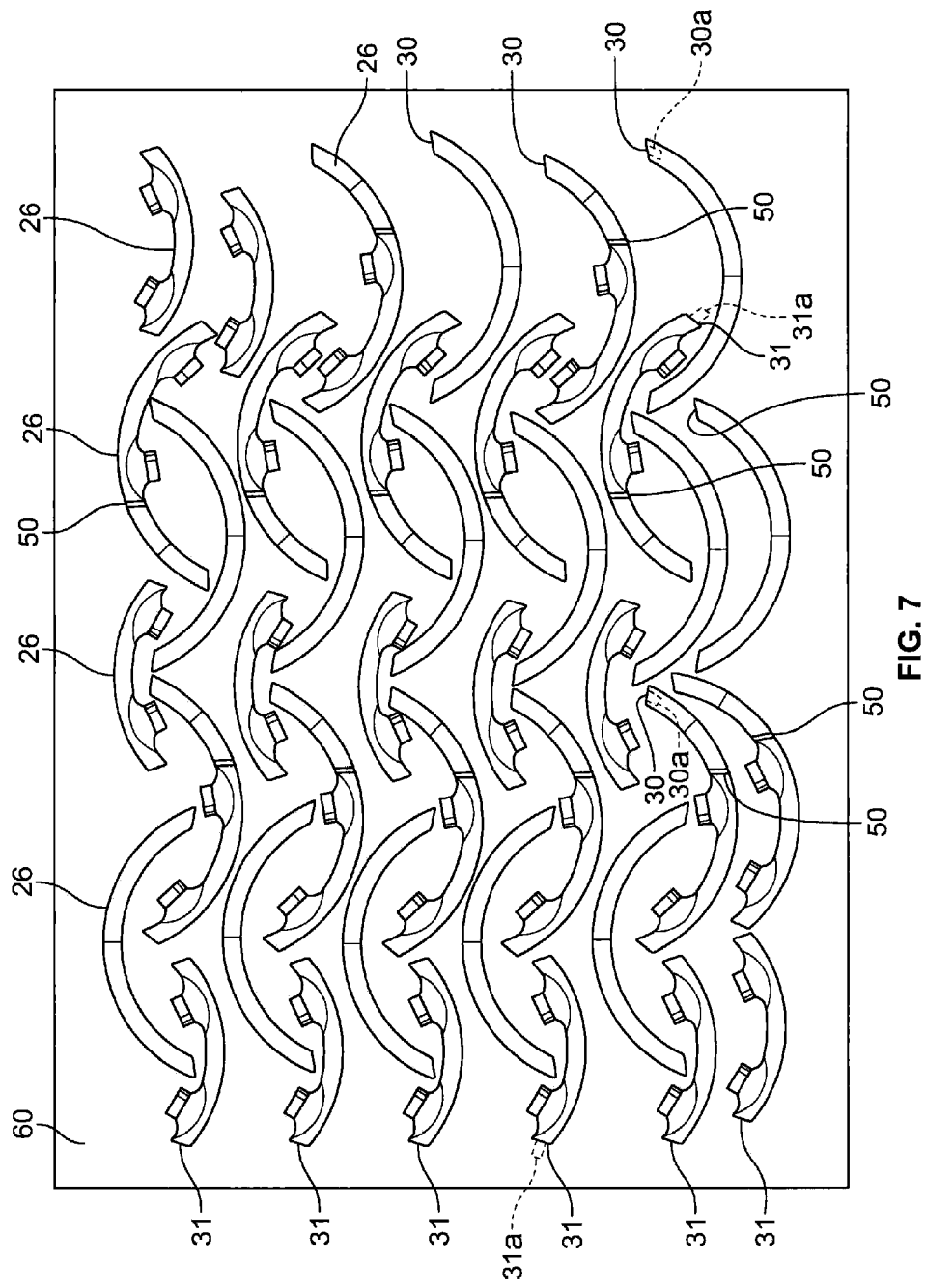
FIG. 7 is a top plan view of a tool for forming components of a rim assembly in accordance with an exemplary embodiment of the present invention.
Figure 8:
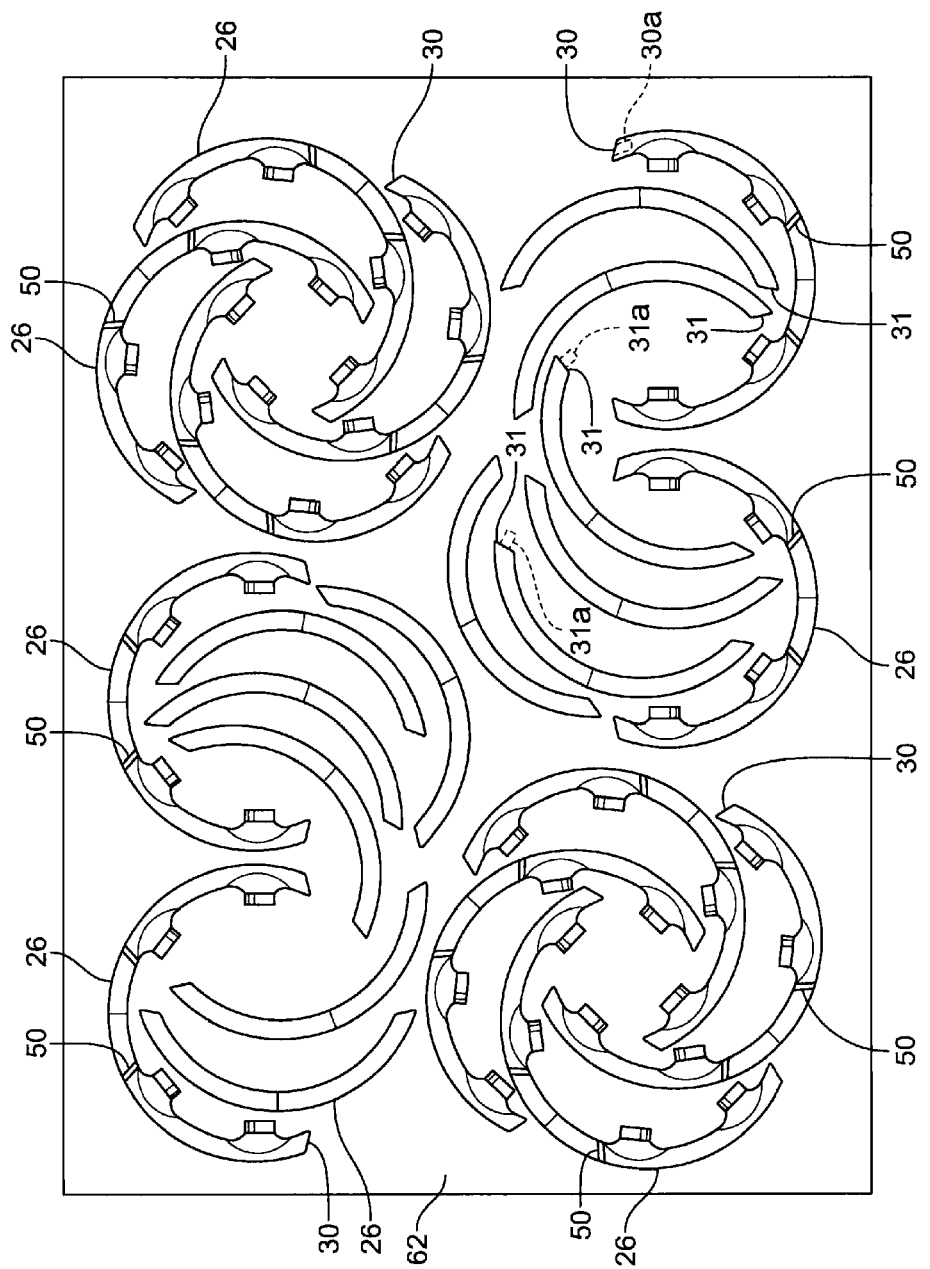
FIG. 8 is a top plan view of a tool for forming components of a rim assembly in accordance with another exemplary embodiment of the present invention.

In accordance with an exemplary embodiment each of the segmented arcuate portions 26 or single first rim portion 22 and single second rim portion 24 defines an inner channel portion 28, which in an exemplary embodiment is configured to surround a first portion of the rim portion of the insert thus a segment portion of an upper portion will surround a portion of the rim while a complimentary lower portion surrounds the remaining portion of the rim. In addition, each of the segmented arcuate portions 26 will have an end portion 30 that is configured to abut another end portion 31 of another segmented arcuate portion 26 to eventually form the upper and lower portions of the rim assembly. For example, end portion 30 may comprise a pocket or recess 30a (illustrated by the dashed lines in FIGS. 7 and 8) configured to receive an extension 31a (also illustrated by the dashed lines in FIGS. 7 and 8) from another end portion 31 thus providing a mechanical interlock between the two pieces. It being understood that only several recesses 30a and extensions 31a are illustrated in FIGS. 7 and 8. In addition and in other alternative exemplary embodiments the end portions 30 and 31 may be provided with other types of interlocking features or alternatively the end portions may just be flat surfaces. In yet another alternative or in addition to any one of these approaches adhesives may be employed to secure the end portions together.

In addition and as illustrated in the attached Figures, some of the upper or first half sections 22 and some of the lower or second half sections 24 further comprise a spoke surrounding portion 32, which is configured to have a channel or receiving area 33 configured to surround a portion of the spokes 18 of the insert.

In accordance with an exemplary embodiment, the molded arcuate portions of the rim assembly are preferably made of a formable material such as polyurethane, resins, foams and expandable foams or expandable foam plastic materials such as polystyrene, polypropylene, polyethylene and inter-polymers that can be easily molded to conform to a portion of the rim assembly that is configured to conform to the shape of insert 12 as well as provide the desired amount of compressibility for the material disposed under the decorative outer layer.

In one non-limiting exemplary embodiment, a contemplated material for use as the portions of the rim assembly is sold under the trademark GECET, which is an expandable engineering resin, wherein a plurality of beads are used to form the part in a mold using a "steam chest" or "steam chest molding process".

Other contemplated materials are sold under the following trademarks and/or acronyms EPS an expanded polystyrene, high impact expanded polystyrene sold under the trademark R-MER (Butadiene/Polystyrene Co-Polymer), polystyrene/polyethylene, interpolymers sold under the trademark ARCEL (Polystyrene/Polyethylene Co-Polymer) and PIOCLEAN, polystyrene/polypropylene sold under the trademark GECET (Polystyrene Maleic Anhydride Co-Polymer), EPP (Expanded Polypropylene), and EPE (Expanded Polyethylene).

In exemplary embodiments, the material used for the molded rim assembly can enhance the comfort of the assembled steering wheel for the operator's hands. As will be described herein, by encapsulating or enclosing the insert or frame portion within a separately preformed molded rim assembly, the manufacturing process of such a steering wheel can be simplified and a uniform exterior surface can be provided.

Figure 4:
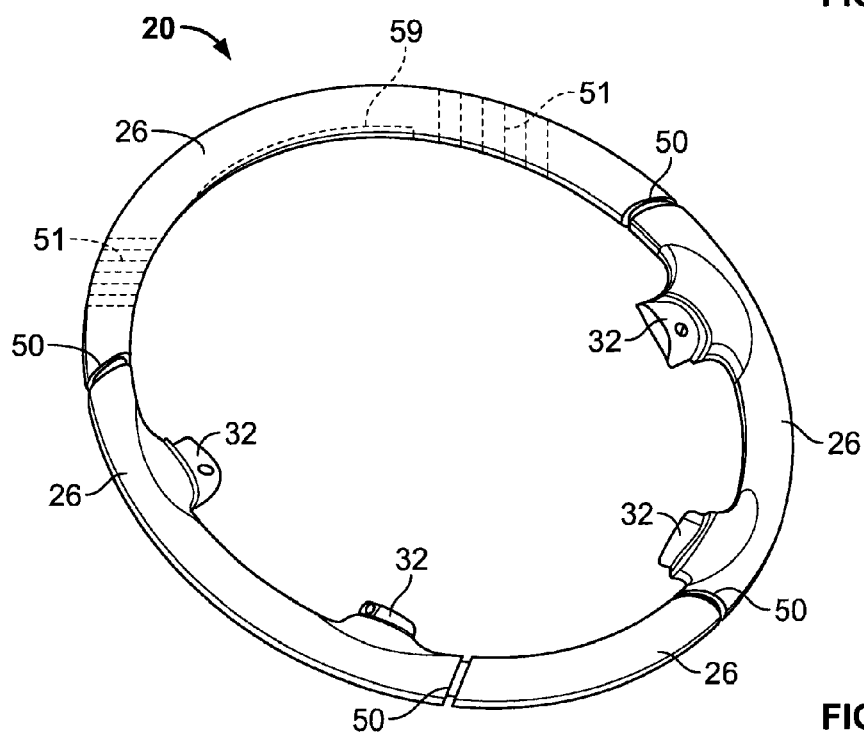
FIG. 4 is a perspective view of a rim assembly manufactured in accordance with an exemplary embodiment of the present invention.
Figure 5:
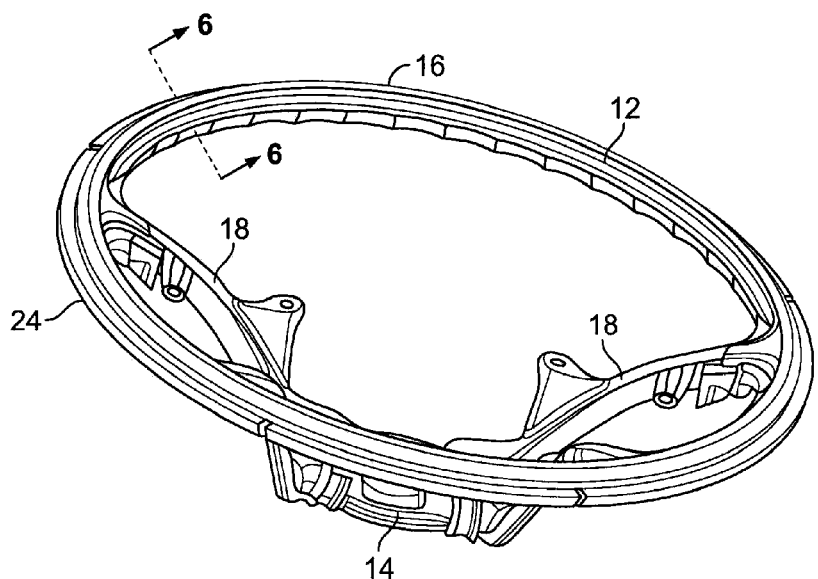
FIG. 5 is a perspective view of a partially assembled steering wheel in accordance with an exemplary embodiment of the present invention.

For example, certain segmented portions of the rim assembly can be provided with a less dense material corresponding to the area where a vehicle operator typically grips the steering wheel (e.g., two and ten o'clock positions). For example and in this embodiment a pair of discrete portions 51 illustrated by the dashed lines in FIG. 4 correspond to areas of less dense material, which in accordance with exemplary embodiments of the present invention may be formed by portions of the upper and lower rim portions wherein discrete materials are placed in certain portions of the tool cavity or alternatively certain arcuate portions for the upper and lower rim portions are formed with less dense materials than the other portions. In other words, these discrete portions of the first or upper and second or lower rim portions are an integral portion of the respective rim portion or alternatively they are separately formed arcuate portions, which are then secured together to form the rim assembly.

In yet another alternative exemplary embodiment, the upper portion of the rim assembly comprises a softer or more compressible material as compared to the lower portion of the rim assembly thus the segments of the rim assembly are capable of being provided with varying durometers (e.g., measurement of the depth of an indentation in the material created by a given force wherein the depth is dependent upon the hardness of the material). Accordingly and in accordance with exemplary embodiments of the present invention portions of the rim assembly are capable of being provided with varying harness due to the separate manufacture of the segmented portions of the rim assembly.

In accordance with an exemplary embodiment of the present invention, the molded portions of the rim assembly are shaped to correspond to and enclose a desired steering wheel insert configuration by applying a high-pressure forming process to a curable medium prior to its application to the insert. In accordance with exemplary embodiments of the present invention, the molded layer can be formed by positioning blown beads of thermoplastic such as EPP or GECET, or, alternatively, injection molding materials, over a forming tool or die that has a cavity corresponding to the desired shape of the steering wheel insert. For example, the molded layer can be formed using steam chest molding techniques wherein expandable polyurethane beads are introduced into a closed mold cavity and expanded by means of hot steam introduced into the mold cavity. This process produces a foamed polystyrene container having the contours of the cavity. Alternatively, the forming tool may comprise a specific profile or protrusion wherein the molding material is vacuum-formed around the protrusion of the tool. In yet another alternative, the tool may have both the protrusions and cavities that shape the molding material during the forming process. U.S. Pat. No. 4,456,443 the contents of which are incorporated herein by reference thereto illustrates a machine for steam chest molding of formed materials.

The molded portions of the rim assembly can therefore be easily formed into a variety of configurations to accommodate numerous factors, such as steering wheel insert configurations of various shapes and sizes and/or a desired operator grip diameter. Moreover, this process is much quicker than the typical manufacturing sequence in which the covering (e.g., urethane foam or injection molded plastic) is molded directly over the steering wheel insert, which can take 3 minutes or longer per steering wheel.

On the other hand and in accordance with an exemplary embodiment of the present invention of the molding of the segments of the rim assembly take approximately 15 seconds per process. Thus, the manufacture and assembly of a steering wheel in accordance with exemplary embodiments of the present invention requires less time and money. In addition, and if required, the formed molded layer can be trimmed or polished to remove any burrs or irregularities on the part.

Figure 3:
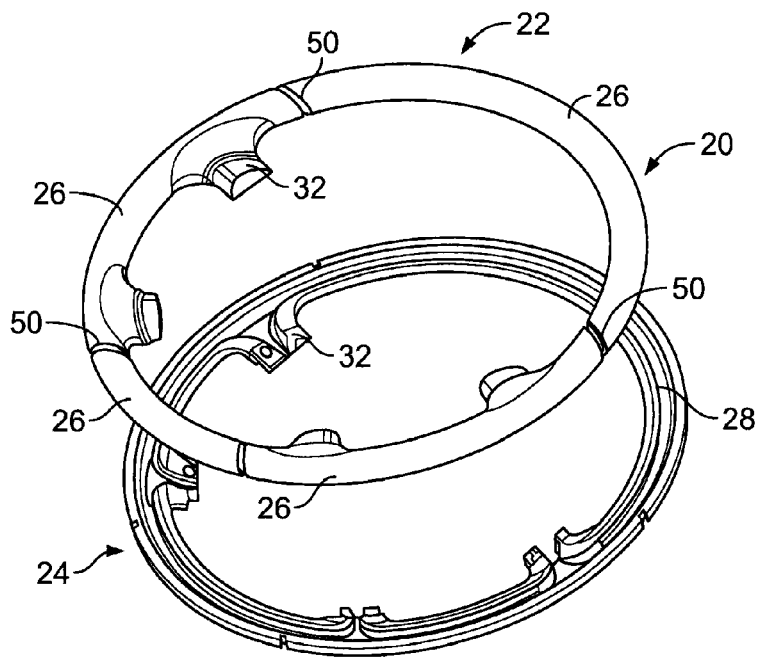
FIG. 3 is an exploded perspective view of a rim assembly manufactured in accordance with an exemplary embodiment of the present invention.

In accordance with the exemplary embodiment of the present invention illustrated in FIG. 3, the molded layer can be formed as separate upper and lower half sections configured to be sandwiched around a corresponding steering wheel insert. Each half section can include a plurality of segmented arcuate portions that each correspond to a segment of the corresponding steering wheel insert's outer rim diameter. When assembled together, each plurality of segmented arcuate portions will comprise the corresponding half section of the molded layer. Of course, it should be understood that the number, size, and configuration of the segmented arcuate portions might vary in exemplary embodiments (e.g., from one per upper and lower half to multiple segments per upper and lower halves).

In accordance with an exemplary embodiment, the molded member or rim assembly is formed via a plurality of separate upper and lower halves that are configured to be sandwiched about the corresponding steering wheel frame. That is, the upper half and the lower half will define a cavity that corresponds to the exterior surface of an appropriate steering wheel insert when placed together. Thus, the upper and lower halves can be pressed onto the steering wheel frame to encapsulate the frame and provide an outer layer of the steering wheel. It should also be understood that, in accordance with alternative exemplary embodiments, each half may be further cut into, or initially formed as, a plurality of half sections that each correspond to a portion of the steering wheel frame diameter or comprise features for operator hand comfort or features for receiving decorative trim pieces (e.g., wood or simulated wood).

Once formed, the upper and lower halves of the pre-molded member or rim assembly, in accordance with an exemplary embodiment of the present invention, can be sandwiched around the outer rim and over portions of the spokes of the steering wheel frame are secured thereto using a plastic joining or heat staking process to attach the upper and lower halves. The heat staking process can involve, in exemplary embodiments, ultrasonic welding and/or thermal insertion. At the completion of the heat staking process, the molded members are mechanically locked about the steering wheel frame. Alternatively, the prefabricated or pre-molded sections can be glued together or simply held onto the rim of the insert via the tension of the leather layer or outer decorative layer wrapped around it. In yet another alternative heat staking can be used in conjunction with adhesives.

In exemplary embodiments, the heat staking process can be utilized to be used to compress the prefabricated or molded member to form thin areas that are too small to be formed by the performing process (for example, sections of approximately 4.0 mm in thickness and less are non-limiting dimensions). For example, the tool or horn of the heat staking process will have features or protrusions that will compress certain portions of the rim assembly to create the grooves while other portions of the tool are used to heat stake the two parts together. In addition and in alternative embodiments, the heat staking process may also be used to form a recessed area for receiving a decorative trim piece.

Accordingly, the heat staking process can be used to form a plurality of tuck grooves 50 in the exterior surface of the rim assembly when also securing the parts of the rim assembly together. In accordance with an exemplary embodiment of the present invention the tuck grooves are positioned for receiving seams of the leather cover when a leather steering wheel cover is sewn onto the steering wheel, as will be described below. By permitting thin areas such as tuck grooves to be formed in pre-formed rim assembly after the rim assembly has been applied to the steering wheel frame or insert, exemplary embodiments of the present invention substantially reduces the susceptibility of the preformed pieces of the rim assembly to breakage during shipping and handling. For example, formed parts with thin areas corresponding to the tuck grooves may cause the same to break apart during shipping as the thinner areas will provide points of weakness.

Alternatively and if suitable materials and/or shipping processes are available, the tuck grooves are formed in the molded member during the forming process. Also, the recessed areas for decorative trim pieces in accordance with alternative exemplary embodiments may be formed by the molding process.

Figure 6:
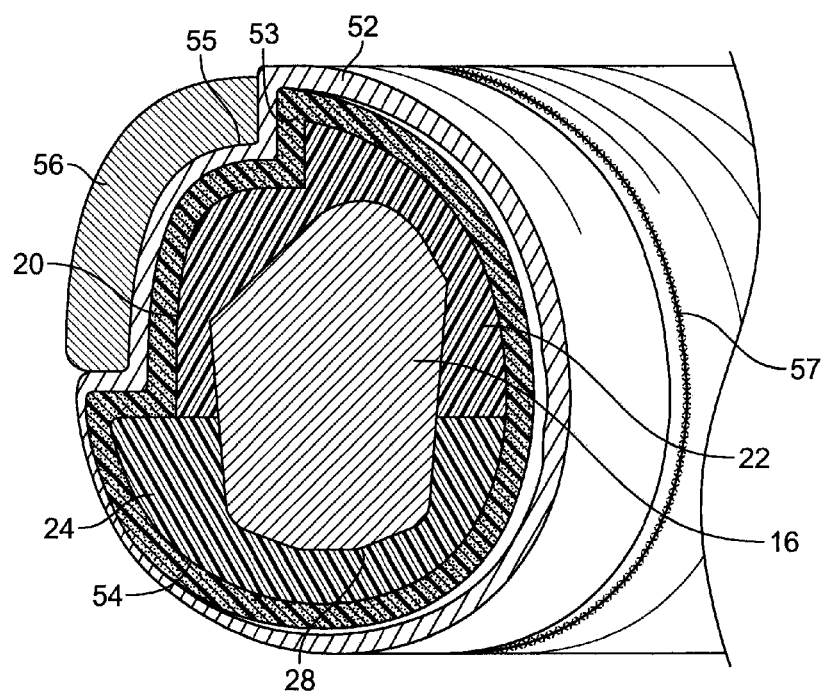
FIG. 6 is a cross sectional view of a portion of a steering wheel rim and rim assembly constructed in accordance with exemplary embodiments of the present invention taken along the line 6-6 of FIG. 5.

Referring now to FIG. 6 a cross sectional view of a portion of an assembled steering wheel is illustrated. Accordingly and once the first and second halves are assembled and secured to the steering wheel insert a decorative layer 52 is secured to the steering wheel. In accordance with an exemplary embodiment the decorative layer has a foam backed layer 53 secured thereto wherein the foam backed layer is disposed between an exterior surface 54 of the molded members and the decorative layer. Alternatively, the foam layer is placed between the decorative layer and the rim assembly. Alternatively and when the materials of the prefabricated or molded members of the rim assembly provide the desired amount of compressibility there is no foam backed layer and the decorative layer is applied directly to the rim assembly formed in accordance with exemplary embodiments of the present invention.

FIG. 6 also shows an alternative exemplary embodiment, wherein the upper or first rim portion is formed with a pocket or recess 55 configured to receive a decorative trim piece 56, which may be a simulated wood material or actual wood material that is inserted into the pocket after the outer decorative layer 52 has been applied. In accordance with exemplary embodiments of the present invention, the outer decorative layer 52 is secured about the rim assembly using known techniques (e.g., sewing and/or adhesives) and the decorative trim piece is also secured to the steering wheel using adhesives or mechanical securement features and/or processes. In accordance with an exemplary embodiment of the present invention, pocket or recess 55 is defined by a feature of the molding tool for forming the rim portions or alternatively pocket or recess 55 is formed by compressing a portion of the rim assembly during a securement process of the same about the rim insert.

Of course and as applications may require, it is understood that the steering wheel and corresponding rim assembly are, in other exemplary embodiments configured to only have an outer decorative layer 52 (with or without foam layer 53) and no decorative trim piece 56 thus the entire outer surface of the steering wheel has a uniform contiguous surface except for any required tuck grooves. Here, the upper and lower rim portions would have similar exterior features thus, no pocket 55 is formed in the rim assembly.

Once the segmented accurate portions are assembled together into the separate half sections, the upper half section and the lower half section will define a cavity that corresponds to the exterior surface of an appropriate steering wheel insert when placed together. It should be appreciated that, in accordance with exemplary embodiments of the present invention, molded half sections can be applied to a variety of wheel designs, such as those having one-spoke designs or, alternatively multi-spoke designs (for example, two-, three-, and four-spoke designs). Also, and depending on the compressibility of the pre-formed sections the cavity may be slightly smaller than the rim of the insert and the sections are compressed about the rim of the insert.

Once formed, the upper and lower half sections of the rim assembly are placed about the outer rim of the insert and over the spokes and secured thereto using a plastic joining or heat staking process to attach the upper and lower half sections. The heat staking process can involve, in exemplary embodiments, ultrasonic welding and/or thermal insertion and the use of fasteners where applicable. At the completion of the heat staking process, the molded layer is positioned about and completely or substantially covers the outer periphery of the steering wheel insert. The steering wheel insert will then be positioned within the molded layer, and the upper and lower half sections of the molded layer will be fixedly secured to each other and/or the insert. In alternative exemplary embodiments, an adhesive can be applied on the inner surface of the preformed half sections prior to disposing the half sections on the steering wheel insert for heat staking, wherein the adhesive secures the two sections together as well as to the insert. In yet another alternative exemplary embodiment only an adhesive is used to secure the two sections together and about the rim insert (e.g., no heat staking). In still another alternative, the sections are held to the insert via the tension of the leather wrapped around it. Of course, any combination of the foregoing is contemplated.

In accordance with exemplary embodiments of the present invention, the heat staking process can also be utilized to can be used to form thin areas that were too small to be formed by the performing process since the thinned out areas corresponding to the tuck grooves may cause areas of localized weakness than may not be suitable for shipping purposes. For example, the heat staking process can be used to form tuck grooves in the exterior of the pre-molded rim assembly for receiving seams when a leather outer steering wheel wrap is sewn onto the steering wheel, as will be described below. In exemplary embodiments, the tuck grooves can be formed between the grooves of adjacent arcuate portions in each half section. By permitting thin areas such as tuck grooves to be formed in pre-formed molded layers after the molded layers have been applied to the steering wheel insert, exemplary embodiments of the present invention can reduce the susceptibility of the preformed portions of the molded layer to breakage during shipping and handling. In alternative exemplary embodiments, the tuck grooves can be formed in the molded member during the forming process.

In exemplary embodiments of the present invention, the pre-formed rim assembly, once disposed on the steering wheel insert, may provide aesthetic qualities in addition to encapsulating qualities. In other alternative exemplary embodiments, an aesthetically pleasing outer steering wheel wrap, such as one made of leather, can be applied to and disposed about the exterior surface of the molded layer to add a decorative outside appearance to the steering wheel. As is known in the related arts, a plurality of covering segments (e.g., leather, vinyl etc) are sewn to the steering wheel rim to provide the outer decorative covering. Typically, edge portions along the length of each segment are secured to each other along the inner periphery of the rim portion while the other end portions of each segment are sewn or secured to other end portions of an adjacent or abutting covering segment and a seam 57 is provided between the two adjacent or abutting segments that circumscribes the diameter of the rim portion. A seam 57 of adjoining end portions is illustrated in FIG. 6. Seam 57 will be thicker than the thickness of decorative layer 52 due to threads or stitching and perhaps overlapping layers thus a protrusion is created.

In accordance with an exemplary embodiment of the present invention tuck grooves 50 are provided in the rim assembly to receive seam 57 therein so that the decorative covering has a smooth exterior surface wherein the protrusion formed by seam 57 is received within the tuck grooves of the rim assembly. Of course, and as applications require (e.g., limited areas using a decorative covering) the rim assembly can be formed without tuck grooves if the same are not necessary. In yet another alternative, a groove may be formed in one or both of the rim portions to define a groove 59 (illustrated partially by the dashed lines in FIG. 4) that would traverse the inner periphery of the rim assembly to receive a seam portion of the leather wrap that is sewn together along the inner periphery of the steering wheel as mentioned above. Groove 59 may traverse the entire inner periphery or only a portion thereof, which depends on whether the leather covering layer covers all or a portion of the rim assembly. Also, and as applications require groove 59 may be used with or without tuck grooves 50.

In exemplary embodiments in which a decorative outer wrap is applied so that the molded layer or prefabricated rim assembly does not provide the outer surface which is gripped by the operator's hands, the outer wrap is secured about the exterior surface of the molded layer or prefabricated rim assembly. It should be appreciated that, in other alternative exemplary embodiments, the outer wrap may be made from one of or a combination of a number of materials to achieve the desired decorative appearance. For example, a portion of the outer wrap may be a material such as leather, while another portion of the outer wrap may be a decorative insert comprising a material such as wood or plastic. In another exemplary embodiment, the decorative outer wrap can have a foam backed layer secured thereto such that the foam backed layer is disposed between the exterior surface of the molded layer or prefabricated rim assembly and the outer wrap.

In exemplary embodiments in which the outer wrap comprises segments of leather material to be sewn over the molded layer or prefabricated rim assembly, tuck grooves formed in the molded layer or prefabricated rim assembly during the heat-staking process or molding process can be utilized to provide for a smooth surface and an aesthetically pleasing smooth outer appearance of the steering wheel. More specifically, once the leather wrap segments are placed over the molded layer or prefabricated rim assembly, the adjacent ends of the wrap segments are aligned with the tuck grooves of the molded layer, and the leather wrap is tightened about the molded layer or prefabricated rim assembly by sewing the adjacent ends of the wrap segments together such that the protrusion created along the seams between the wrap segments will be disposed within a corresponding tuck groove. By disposing the seams within the preformed tuck grooves, the steering wheel can be provided with a smooth surface and an aesthetically pleasing smooth outer appearance.

Referring now to FIGS. 7 and 8, tools or dies 60 and 62 for use in forming components of the rim assembly in accordance with exemplary embodiments of the present invention are illustrated. As illustrated, the dies comprise a plurality of cavities each of which comprise a portion defining the upper and lower segmented arcuate portions 26 wherein an upper die or complimentary portion (not shown) provides the remaining portion of the segmented arcuate portions 26 wherein the dies are used in the injection molding process or steam chest molding process.

As shown, each of the dies are configured to allow the cavities defining the upper and lower segmented arcuate portions to be nested about each other thus improving the overall efficiency of the molding processes. In other words, more rim assemblies can be manufactured via exemplary embodiments of the present invention as opposed to the tooling required for molding a layer about the rim portion of the insert.

Furthermore and since the unassembled rim assemblies are secured to the rim portion of the insert via a process that allows the same to be secured thereto at a location remote from the molding process the unassembled rim assemblies can be shipped in a further nested arrangement thus providing further efficiencies in the shipping process. Thereafter and once the unassembled rim portions arrive at the location where the steering wheel is assembled the segmented arcuate upper and lower halves are secured to the rim portion of the insert. In accordance with exemplary embodiments of the present invention, the tools or dies will provide features for forming corresponding features of the components of the rim assembly (e.g., interlocking end portions, channels, exterior surfaces, pocket or recessed exterior areas for decorative pieces etc., etc.).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering wheel assembly, comprising:
    an insert comprising an armature, a rim portion and at least one spoke connecting the armature to the rim portion;
    a rim assembly comprising a first rim portion and a second rim portion, the first rim portion and the second rim portion each being configured to be disposed around a periphery of the rim portion of the insert and the first rim portion and the second rim portion are configured to be secured to each other about the rim portion of the insert, the first rim portion and the second rim portion each being separately formed from a polymeric material prior to the securement of the rim assembly to the rim portion of the insert; and
    a decorative cover disposed about an exterior surface of the rim assembly;
    wherein the first rim portion and the second rim portion each have a channel portion configured to receive a portion of the rim portion therein and an outer surface of the first rim portion and an outer surface of the second rim portion each have a groove portion for receiving a seam of the decorative cover therein and the rim assembly completely surrounds the rim portion of the insert.

2. The steering wheel assembly as in claim 1, wherein the first rim portion is an upper portion of the rim assembly and the second rim portion is a lower portion of the rim assembly and the upper portion is formed from a material having a lower durometer value than the lower rim portion.

3. The steering wheel assembly as in claim 1, wherein the first rim portion has a pair of discrete portions each of which has a lower durometer value than other portions of the first rim portion and the second rim portion has a pair of discrete portions each of which has a lower durometer value than other portions of the second rim portion.

4. The steering wheel assembly as in claim 1, wherein the decorative cover includes a foam layer and the polymeric material is an expanded foam plastic material selected from the group consisting of expanded polystyrene, expanded polystyrene/polyethylene; expanded polypropylene, expanded polyethylene and combinations thereof.

5. The steering wheel assembly as in claim 1, wherein the insert is metal and the rim assembly completely surrounds the rim portion of the insert and the polymeric material is an expanded foam plastic material selected from the group consisting of expanded polystyrene, expanded polystyrene/polyethylene; expanded polypropylene, expanded polyethylene and combinations thereof.

6. The steering wheel assembly as in claim 1, wherein the first rim portion and the second rim portion are heat staked to each other after the first and second rim portions are disposed about the rim portion of the insert and the polymeric material is an expanded foam plastic material selected from the group consisting of expanded polystyrene, expanded polystyrene/polyethylene; expanded polypropylene, expanded polyethylene and combinations thereof.

7. The steering wheel assembly as in claim 1, wherein the first rim portion and the second rim portion are heat staked to each other after they are disposed about the rim portion of the insert and the groove portion of the first rim portion and the second rim portion is formed during the heat staking of the first rim portion and the second rim portion to each other and the groove portions of the first rim portion and the second rim portion align with each other.

8. The steering wheel assembly as in claim 1, wherein the decorative cover includes a foam layer and the steering wheel assembly further comprises a decorative trim piece disposed in a pocket formed in the rim assembly.

9. The steering wheel assembly as in claim 1, wherein the polymeric material of at least the first rim portion or the second rim portion is an expandable resin.

10. The steering wheel assembly as in claim 1, wherein the first rim portion and the second rim portion each have a channel portion configured to receive a portion of the rim portion therein and the first rim portion and the second rim portion each have a spoke portion configured to receive a portion of the at least one spoke therein.

11. The steering wheel assembly as in claim 1, wherein the first rim portion comprises a plurality of separate arcuate portions and the second rim portion comprises a plurality of separate arcuate portions each of the plurality of arcuate portions being configured to mate with each other and surround a portion of the rim portion and the plurality of separate arcuate portions are of dissimilar lengths.

12. The steering wheel assembly as in claim 11, wherein the plurality of separate arcuate portions completely surround the rim portion and the plurality of separate arcuate portions are heat staked to each other after they are disposed about the rim portion and a plurality of grooved portions are formed in the exterior surface of the rim assembly, the groove portions receiving seams of the decorative cover therein.

13. The steering wheel assembly as in claim 12, wherein the grooved portions are formed during the heat staking of the plurality of separate arcuate portions to each other.

14. A steering wheel assembly, comprising:
    an insert comprising an armature, a rim portion and at least one spoke connecting the armature to the rim portion;
    a rim assembly comprising a first rim portion and a second rim portion, the first rim portion and the second rim portion each being configured to be disposed around a periphery of the rim portion of the insert and the first rim portion and the second rim portion are configured to be secured to each other about the rim portion of the insert, the first rim portion and the second rim portion each being separately formed from a polymeric material prior to the securement of the rim assembly to the rim portion of the insert; and
    a decorative cover disposed about an exterior surface of the rim assembly;
    wherein the first rim portion and the second rim portion each have a channel portion configured to receive a portion of the rim portion therein and the first rim portion and the second rim portion each have a spoke portion configured to receive a portion of the at least one spoke therein.

15. A steering wheel assembly, comprising:
    an insert comprising an armature, a rim portion and at least one spoke connecting the armature to the rim portion;
    a rim assembly comprising a first rim portion and a second rim portion, the first rim portion and the second rim portion each being configured to be disposed around a periphery of the rim portion of the insert and the first rim portion and the second rim portion are configured to be secured to each other about the rim portion of the insert, the first rim portion and the second rim portion each being separately formed from a polymeric material prior to the securement of the rim assembly to the rim portion of the insert; and
    a decorative cover disposed about an exterior surface of the rim assembly;
    wherein the first rim portion comprises a plurality of separate arcuate portions and the second rim portion comprises a plurality of separate arcuate portions each of the plurality of arcuate portions being configured to mate with each other and surround a portion of the rim portion and the plurality of separate arcuate portions are of dissimilar lengths.

* * * * *